Patented Mar. 24, 1925.

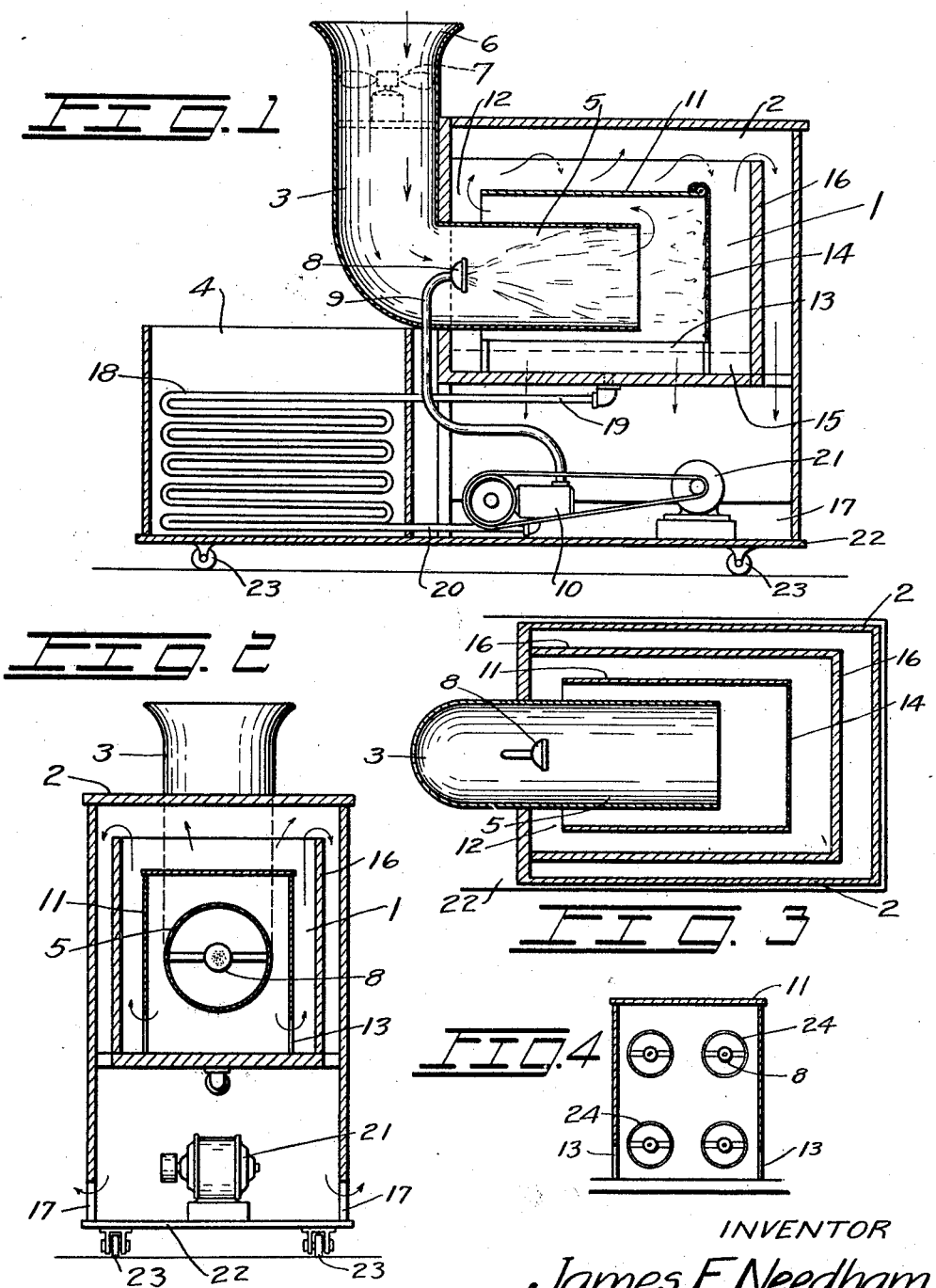

1,530,607

UNITED STATES PATENT OFFICE.

JAMES F. NEEDHAM, OF HANFORD, WASHINGTON.

PORTABLE PRECOOLING MACHINE.

Application filed July 9, 1923. Serial No. 650,546.

*To all whom it may concern:*

Be it known that I, JAMES F. NEEDHAM, a citizen of the United States, residing at Hanford, county of Benton, and State of Washington, have invented a new and useful Portable Precooling Machine; and I do hereby declare that the following is a full, clear, and exact specification, such as will enable others skilled in the art to which it appertains to make and use the same.

The invention is a device for thoroughly cooling the air in an enclosed area by drawing it downward from the top of the area, mixing it with a cold water spray, separating the water from it, and then discharging it at the bottom of the area.

The object of the invention is to provide a device for thoroughly cooling the air in an enclosed area by circulating the air and bringing it into contact with a means for chilling it.

Another object of the invention is to provide a means for thoroughly chilling all of the air in an enclosed area, by the use of cold water, or a very small amount of ice.

And a further object of the invention is to provide a device for thoroughly cooling the air in an enclosed area, that is portable.

With these ends in view the invention embodies a horizontal sleeve having a spray nozzle on the inside, an air duct extending upward from the rear end of the sleeve, a casing surrounding the open end of the sleeve, having a fabric screen, which will hang in front of the open end of the sleeve, and the rear end of said casing being open; a housing surrounding the casing, with its upper side open, another housing surrounding the latter housing and extending downward, with openings adjacent its lower end; a pump for supplying water under pressure to the nozzle, and a means for cooling the water.

Other features and advantages of the invention will appear from the following description taken in connection with the drawings, wherein:

Figure 1 is a longitudinal section.

Figure 2 is a cross section, looking toward the spray nozzle.

Figure 3 is a sectional plan on the center line of the sleeve surrounding the spray nozzle.

Figure 4 is a view showing the casing surrounding the sleeve, showing an alternate design in which more than one of the spray nozzles are used.

In the drawings I have shown my device as it would be constructed wherein numeral 1 indicates the cooler, numeral 2 the housing surrounding the cooler, numeral 3 the air duct, and numeral 4 the tank for cooling the water.

The cooler 1, which embodies the principle element of my prior Patent Number 1,448,813, which was issued March 20, 1923, may be constructed as shown, with a sleeve 5, to the rear end of which the air duct 3, which extends upward to the top of the room in which the device may be placed, is connected. The upper end of the duct 3 may be expanded as shown at the point 6; and may have a fan 7 as indicated by the dotted lines, placed in it, to force air downward. A nozzle 8 is placed in the sleeve 5 and connected through a pipe 9 to a pump 10, which will provide a constant pressure so that water passing through it and through the nozzle will leave the nozzle in the form of a very fine spray. The nozzle is placed at such a distance from the end of the sleeve that the outer wall of the spray will engage the inner surface of the sleeve before it reaches the end. It will be seen that a nozzle arranged in a sleeve in this manner will create a vacuum and draw the air downward through the duct 3 as indicated by the arrows; and it will also be seen that as this air passes through the spray it will become thoroughly saturated. A casing 11 is placed around the sleeve 5 and is constructed so that it will completely surround it, and arranged so that air leaving the end of the sleeve 5 must pass backward and out of an opening 12 at the rear, or downward to openings 13 at the bottoms of the sides. The casing 11 has a fabric screen 14 held over a roll at the edge by a draw string or wire as shown and suspended directly in front of the sleeve 5, so that as the saturated air passes out of the end of the sleeve it will strike this screen and the screen will absorb the moisture and thereby separate the water from the air. The water will drip downward along the screen to a reservoir 15 at the bottom, and the air will pass out of the rear or under the edges as hereinbefore described. Around the casing 11 is a housing 16, which is of a rectangular shape, and open at the top, so that air passing out of the casing 11 will rise upward and pass out of the top.

The cooler is completely surrounded by the housing 2, which is closed at all of the sides and top, with the exception of openings 17 at the bottom; and it will be seen that air passing out of the top of the housing 16 will pass downward and out of the openings 17, as indicated by the arrows in Figure 2. Therefore, the warm air entering the duct 3, will first be thoroughly chilled by being saturated with water, then separated from the water, circulated through the cool casing, and then discharged at the bottom, thoroughly chilled.

The tank 4, in which the water is cooled, is provided with pipe coils 18, which are connected by a pipe 19 to the reservoir 15 at the bottom of the cooler 1, and also through a pipe 20 to the pump 10, so that the water used for cooling the air may be recirculated and used continuously. The tank 4 may be filled with cold water, ice or any other suitable substance for cooling, and the water in the tank, and also the water used for spraying, may have salt mixed in it to prevent its freezing. The pump 10 may be of any suitable design and may be driven by a motor 21, or any other suitable means. The entire device may be constructed on a platform 22, which may be mounted on rollers 23.

In the design shown in Figure 4, I have shown an alternate arrangement, showing four sleeves 24 similar to the sleeve 5, each having the nozzle 8 in it, as it is understood that one or any number of nozzles, each having an individual sleeve, may be used.

The construction will be readily understood from the foregoing description. To use the device the tank 4 may be filled with cold water or ice, and enough water placed in the circulating pipes to fill the reservoir 15 up to the dotted line shown in Figure 1. The entire device may then be placed into an enclosed area similar to a refrigerator car that may have been filled with fruit, and as the pump is set in motion a spray will be ejected from the nozzle, which will draw air from the top of the car through the duct 3, chill it in a cooler 1 as hereinbefore described, then circulate it through the housing 2 and then discharge it into the bottom of the car. It will be seen that as the warm air is taken out of the top and the cold air discharged into the bottom, it will start a circulation of the air in the car, and all of the warm air in the car will be forced to the top, and as the device itself actually creates a circulation, all of the air in the car or the like will be thoroughly chilled.

Having thus fully described the invention, what I claim as new and desire to secure by Letters Patent, is:

1. A pre-cooler having a combination of a spray in a sleeve a vertical duct connected to the rear end of the sleeve so that the vacuum created by the nozzle will draw air downward; a casing surrounding the open end of the sleeve, having a fabric screen in front of the open end of the sleeve, and an opening adjacent the rear end of the sleeve; a housing with its top open surrounding the casing; and another housing with its top closed, and openings adjacent its bottom surrounding the former housing.

2. A pre-cooler having a horizontal sleeve with a nozzle in it; means for supply water to the nozzle; means for drawing the air downward; a fabric screen in front of the open end of the sleeve; and a housing surrounding the sleeve, with openings adjacent its bottom.

3. A pre-cooler having a sleeve with a nozzle in it; a pump for supply water to the nozzle, which nozzle is arranged in such a manner that the outer surface of a spray leaving it will engage the inner wall of the sleeve before reaching the end, means for cooling the water used for the spray; means for drawing the air downward; and a suitable housing surrounding the sleeve, with openings adjacent its bottom.

4. A device for cooling air in enclosed areas, comprising a sleeve, a nozzle in the sleeve, means for supplying cold water under pressure to the nozzle, a vertical duct leading to the sleeve, means for causing air to pass downward in the duct, a fabric screen in front of the open end of the sleeve; and suitable housings for guiding the air from the sleeve upward and then downward to openings in the lower end of the outer housing.

JAMES F. NEEDHAM.